United States Patent [19]

Hehl

[11] Patent Number: 4,462,783
[45] Date of Patent: Jul. 31, 1984

[54] MECHANISM FOR EXCHANGING MOLDING DIES IN AN INJECTION MOLDING MACHINE

[76] Inventor: Karl Hehl, Arthur-Hehl-Strasse 32, 7298 Lossburg 1, Fed. Rep. of Germany

[21] Appl. No.: 506,025

[22] Filed: Jun. 20, 1983

[30] Foreign Application Priority Data

Jun. 18, 1982 [DE] Fed. Rep. of Germany ....... 3222743
Nov. 13, 1982 [DE] Fed. Rep. of Germany ....... 3242169

[51] Int. Cl.³ .......................... B29C 1/00; B29F 1/00
[52] U.S. Cl. .................................. 425/183; 100/918; 425/186; 425/190; 425/575
[58] Field of Search ............... 425/182, 183, 186, 190, 425/184, 575, 574; 100/918

[56] References Cited

U.S. PATENT DOCUMENTS 3,782,874  1/1974  Hehl .................................... 425/190
3,898,030  8/1975  Bishop ................................ 425/183
3,982,869  9/1976  Eggers ............................... 425/575
4,025,268  5/1977  Taylor ................................ 425/575
4,379,685  4/1983  Tada et al. .......................... 425/183

Primary Examiner—Willard E. Hoag
Attorney, Agent, or Firm—Joseph A. Geiger

[57] ABSTRACT

A mechanism for the program-controllable exchange of injection molding dies in the die closing unit of an injection molding machine, comprising a translation table with two die emplacements which are alternatingly movable into transverse alignment with the die clamping space, for horizontal transfer of a die assembly. The transfer movement is produced by a compact roller chain drive with drive pins engaging recesses in a drive rack. The die assemblies have standardized back plates for positioning and guidance of the die assembly by means of aligned guide faces on the translation table and on a guide shelf of the die closing unit. Each die emplacement has a separate drive rack which entrains a die assembly. The drive racks are restrained against movement, when outside the transfer position.

17 Claims, 17 Drawing Figures

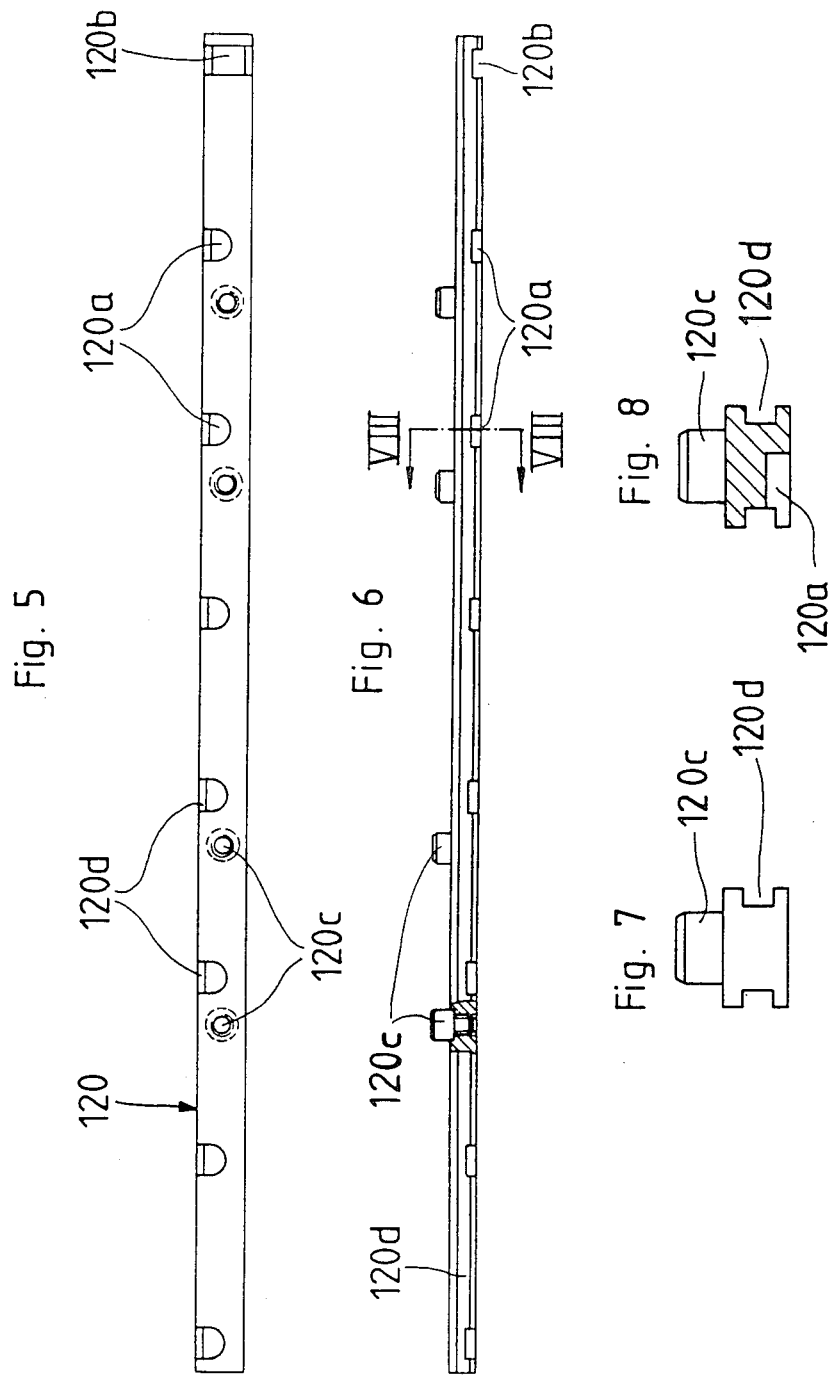

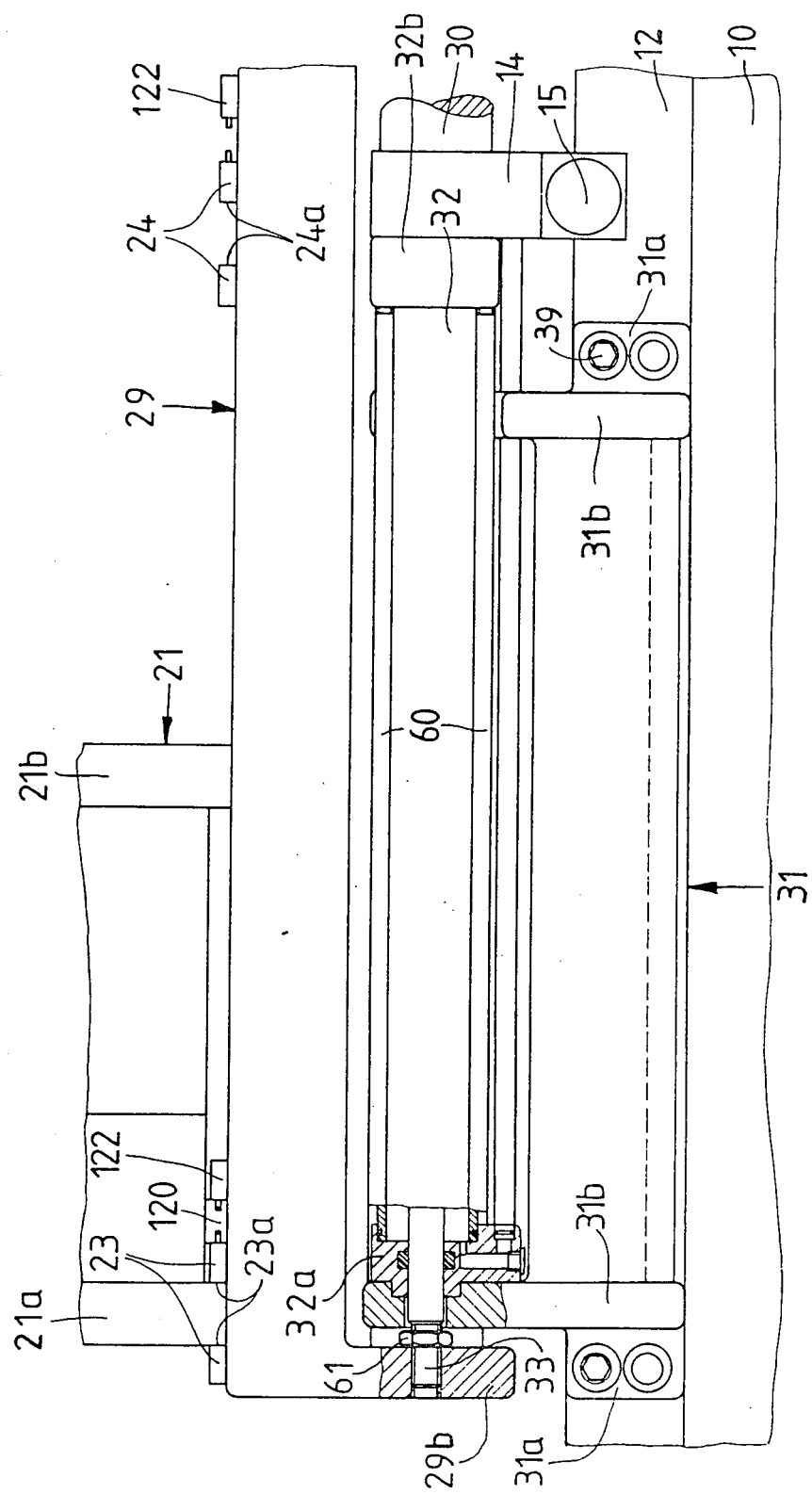

Fig. 10
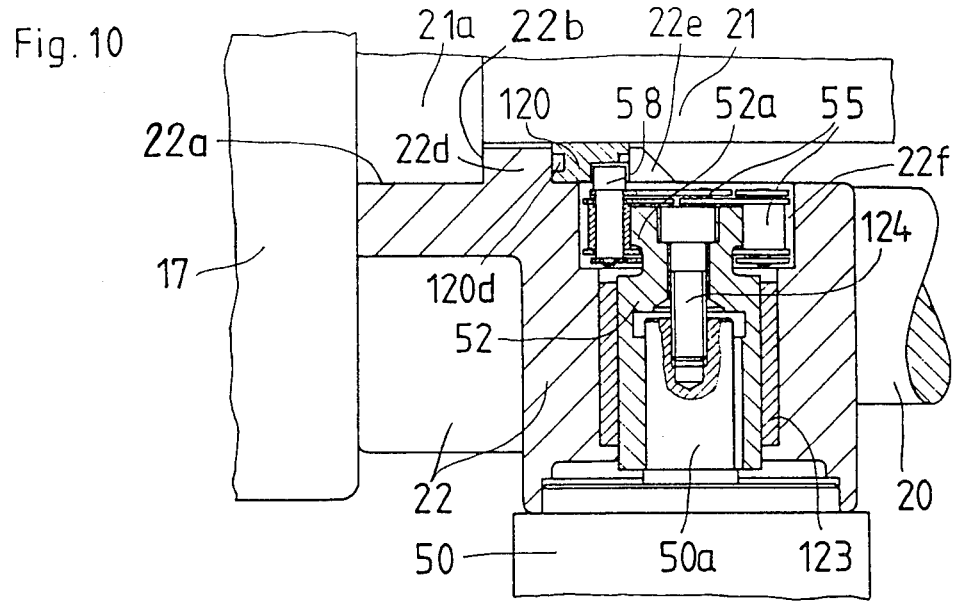
Fig. 11
Fig. 12
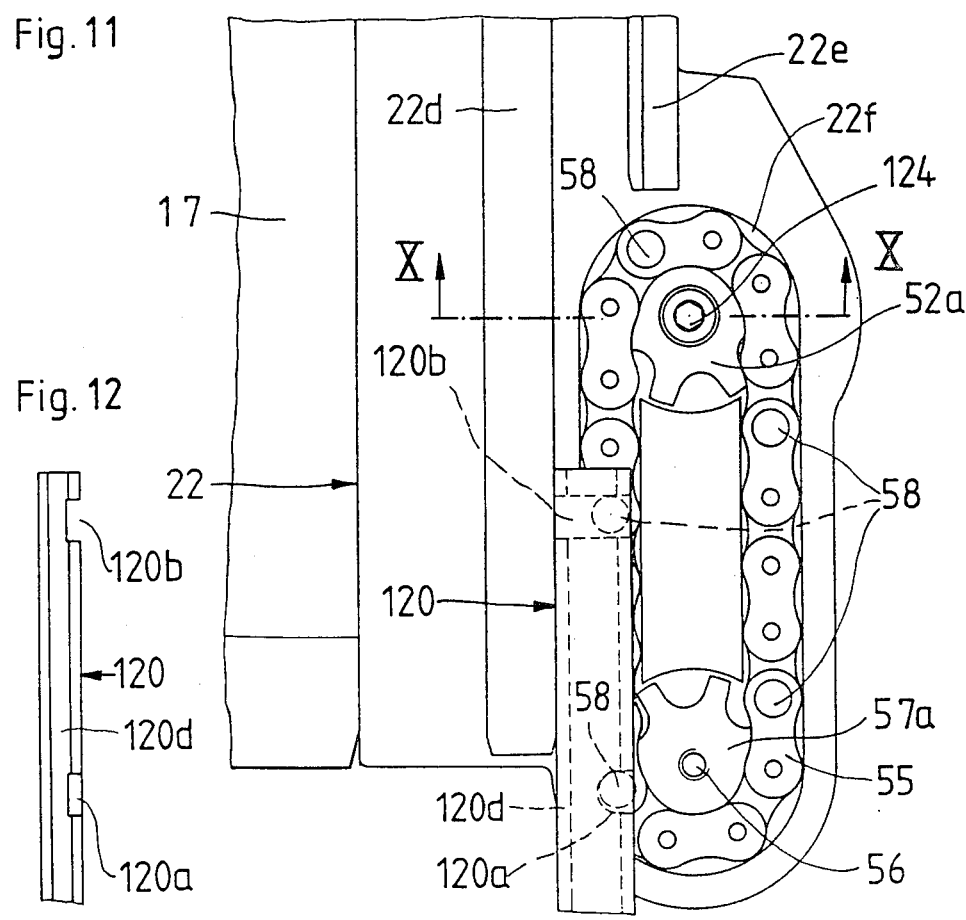

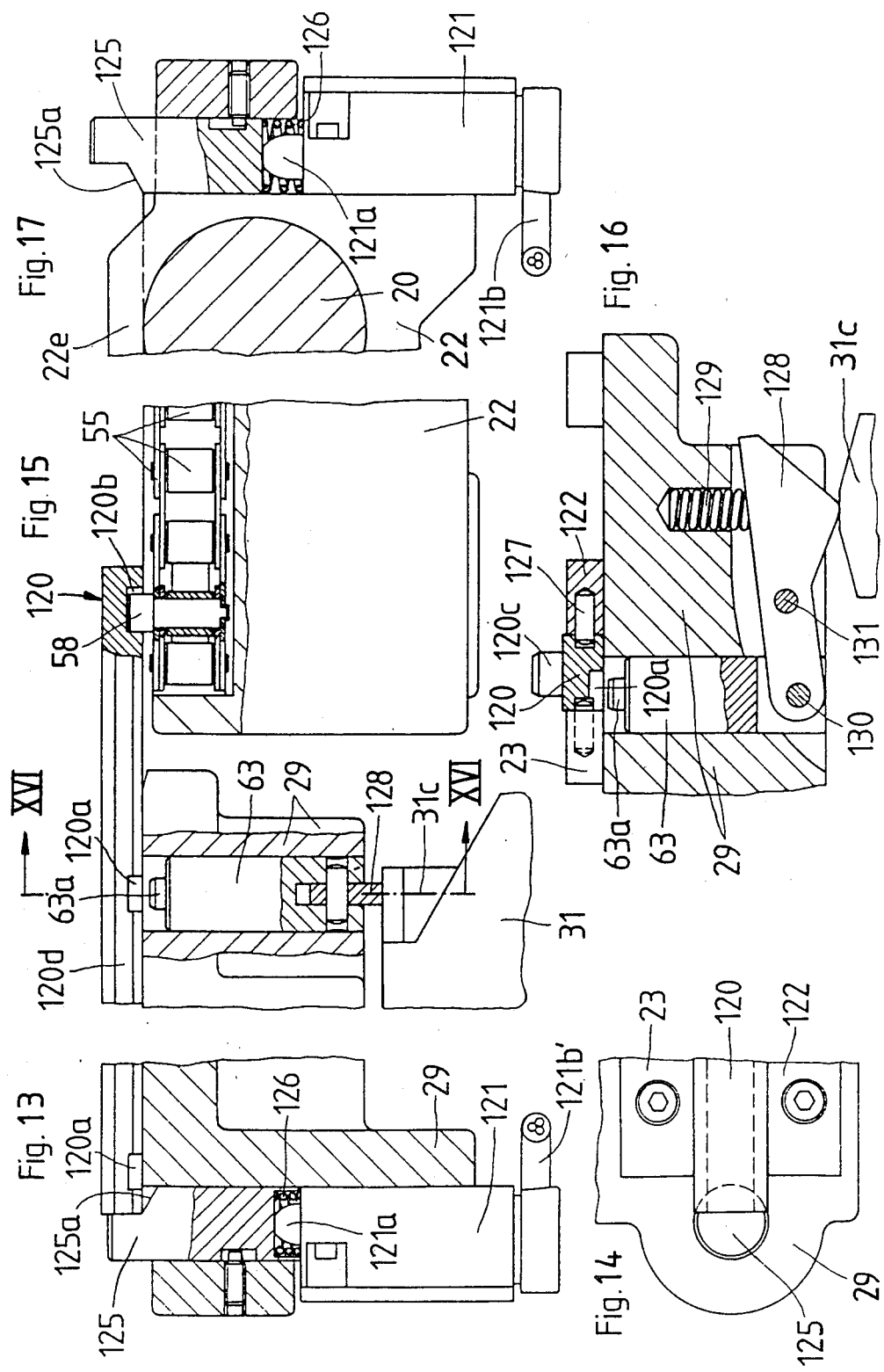

MECHANISM FOR EXCHANGING MOLDING DIES IN AN INJECTION MOLDING MACHINE

BACKGROUND OF THE INVENTION

1. Field of the Invention

The present invention relates to injection molding machines and, more particularly, to a mechanism which is adapted for the program-controlled exchange of one injection molding die for another in the die closing unit of a plastics injection molding machine.

2. Description of the Prior Art

The changeover of an injection molding machine from the production of a given part to the production of another part requires an exchange of injection molding dies in the die closing unit and, in some cases, also an exchange of injection units.

The exchange of injection molding dies tends to necessitate a considerable amount of time machine downtime, not only for the removal of the previously used die assembly and the insertion and attachment of the new die assembly, but also for the transfer from the former to the latter of the various fluid lines and/or air hoses, as well as any electrical and other operating connections. Finally, the newly installed injection molding die needs to be preheated to the required operating temperature, before production operations can be resumed.

As part of a mechanized die exchange procedure, it has therefore already been suggested to use hydraulically operated clamping devices in the place of the conventional threaded fasteners to clamp the two die halves to their die carrier plates. Several such clamping devices are known from the prior art. An improved attachment mechanism for interchangeable injection molding dies is disclosed in my copending U.S. patent application, Ser. No. 449,550 of Dec. 13, 1982.

In a pamphlet entitled "Battenfeld-Symposium mit Sonderschau 4.-7. Mai 1982", it is further suggested to provide a horizontal transfer device in the form of a dolly, the wheels of which are supported on the factory floor. The dolly is guided for longitudinal translational movements along the machine base, carrying on its top a horizontal roller conveyor. A die assembly resting on this roller conveyor can thus be transferred horizontally into the clamping space of the die closing unit, using a drive spindle, for example.

The two die halves of the die assembly are provided with special back plates which are larger than the die plates themselves, so as to allow for a mechanized insertion and clamping of the die assembly. In the prior art device mentioned, the back plates of the two die halves form upwardly and downwardly protruding flanges with a tapered shoulder profile. The latter is engageable by a plurality of matchingly tapered clamping plungers advancing vertically from above and below against the back plate.

In order to transfer a previously used injection molding die from the die closing unit to the transfer dolly, the clamping devices have to be released by retracting the clamping plungers; then the two die halves are latched together and the movable die carrier plate is retracted to free the centering collar of the movable die half from the movable die carrier plate. This leaves the entire die assembly supported on the stationary die carrier plate, which engages and guides the back plate of the stationary die half by means of guide faces on upper and lower guide blocks which also house the clamping plungers. In this guide configuration, the die assembly is retracted horizontally, until it comes to rest on the roller conveyor of the transfer dolly. The insertion of a new die assembly requires the same steps, in reverse order, with the exception that the clamping plungers of the stationary die carrier plate are actuated, before the movable die carrier plate is approached against the die.

Such an arrangement has several shortcomings: Among them are the fact that the movable die carrier plate needs to be moved away and that, consequently, it cannot participate in the support and guidance of the die assembly during the transfer movement. The support of the assembly is therefore one-sided. The problem-free reengagement of the movable die carrier plate over the centering collar of the movable die plate is not assured. The necessary movement clearances between the guide faces of the guide blocks and the back plate of the stationary die half make it possible for the vertically moving clamping plungers to shift the die half out of position, when they execute their clamping movement.

The absence of a positively controlled transfer drive, combined with the fact that the level of the roller conveyor is determined by the engagement between the dolly wheels and the floor, independently of the machine base, preclude a programmed, fully automated exchange of injection molding dies. Furthermore, the fact that the die assembly is guided on only one of the two die carrier plates limits the application of this device to die assemblies of moderate weight.

A die transfer table is disclosed in my German Offenlegungsschrift (Publ. Application) No. 24 21 811 and corresponding U.S. Pat. No. 3,973,888. This prior art device is designed for use with an injection molding die which has a transfer portion of the die in duplicate units, for alternating insertion into the die assembly in the clamping space of a vertically operating die closing unit. While the closed die is being injected with plastic raw material in the die closing unit, the other transfer portion of the die assembly rests on the transfer table, where it is being loaded with an insert.

This device is not suitable for use with a horizontally operating die closing unit and it can therefore not be used for the program-controlled exchange of a succession of injection molding dies of non-uniform structure, particularly dies of unequal axial depth.

SUMMARY OF THE INVENTION

Underlying the present invention is the primary objective of suggesting an improved mechanism for exchanging injection molding dies in the horizontal die closing unit of an injection molding machine, which mechanism is to avoid the shortcomings of the prior art devices mentioned and to offer the possibility of a program-controlled automated die exchange procedure.

The present invention proposes to attain this objective by suggesting a die exchange mechanism which features a longitudinally movable translation table with two identical die emplacements which are alternatingly translatable to a transfer position in alignment with the operating position of the die assembly in the clamping space of the die closing unit.

The die carrier members of the die closing unit and each die emplacement of the translation table are equipped with means for guiding and supporting a die assembly, the guide means being aligned for a straight-line transfer path, when the die emplacement coincides with the transfer position. Each die assembly has a pair of standardized oversize back plates attached to its two die halves. The rectangular back plates have upwardly and downwardly protruding flange portions with horizontal end faces and parallel vertical guide faces which cooperate with the guiding and supporting means of the die emplacements and of the die carrier plates.

The invention further suggests a transfer drive which is engageable with a die assembly in the transfer position on the translation table and which is adapted to entrain the die assembly in a positively controlled transfer movement between the transfer position and the operating position in the die closing unit.

In a preferred embodiment of the invention, the die carrier members of the die closing unit are equipped with horizontally movable clamping plungers with hook-like clamping noses which cooperate with the flange portions of the back plates to releasably clamp the die halves against the mounting faces of the die carrier members. This configuration makes it possible to insert and remove the die assembly as a closed unit, without opening the die closing unit more than a minimal amount, so that the die carrier plates will provide additional axial guidance for the die assembly.

The proposed mechanism further features a transfer drive with a horizontally circulating endless roller chain arranged in a guide shelf on the lower part of the stationary die carrier member. The roller chain is equipped with a number of vertical drive pins cooperating with matching drive recesses of a drive rack which is connected to the die assembly. Rather than providing a separate drive rack for each die assembly, the invention suggests a configuration in which only two detachable drive racks are used, one with each die emplacement of the translation table. The guide shelf of the stationary die carrier member and the two die emplacements have separate guides for the drive racks.

In the die emplacements, each drive rack is vertically restrained by its guide, so that it disconnects from the die assembly when the latter is lifted from the translation table. Each guide rack has upwardly protruding entrainment pins engaging matching standardized bores of the stationary half of the die assembly.

In a further improvement, the invention suggests the arrangement of a restraining plunger in each die emplacement which normally blocks the longitudinal movement of the drive rack, but is retracted away from the die rack, when the die emplacement moves into the transfer position. End switches with special drive plungers are arranged on the guide shelf and in the two die emplacements, and they cooperate with the extremities of the two drive racks to stop the transfer movement and to provide a mechanical stop.

The translation table is supported by a central supporting frame and by a sheet metal bracket which are both attached to the machine base. The supporting frame is vertically adjustable in relation to the bracket, for a precise vertical alignment of the translation table with the die closing unit. A hydraulic cylinder produces the translatory movements of the translation table.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 5 is an enlarged view of the drive rack of the transfer drive, as seen from below;

FIG. 6 shows the drive rack of FIG. 5 from the side;

FIG. 7 is a further enlarged end view of the drive rack of FIGS. 5 and 6;

FIG. 8 is a cross section taken along line VIII—VIII of FIG. 6;

FIG. 9 shows, in an enlarged detail of the frontal elevational view of FIG. 4, portions of the support and drive configuration of the translation table;

FIG. 10 shows, in a vertical longitudinal cross section corresponding to the orientation of FIG. 4, further enlarged details of the transfer drive;

FIG. 11 is a plan view corresponding to FIG. 10;

FIG. 12 is an end view of the drive rack which is shown in FIG. 11;

FIG. 13 shows, in a vertical transverse cross section corresponding to the orientation of FIG. 1, an enlarged detail of the outer side the translation table;

FIG. 14 is a plan view corresponding to FIG. 13;

FIG. 15 shows enlarged details of the transfer drive at the inner side of the translation table in the same section plane as FIG. 13;

FIG. 16 shows the configuration of FIG. 15 in a vertical longitudinal cross section corresponding to the orientation of FIG. 4; and FIG. 17 shows further details of the transfer drive in the same section plane as FIGS. 13 and 15.

DESCRIPTION OF THE PREFERRED EMBODIMENT

Figure 1:
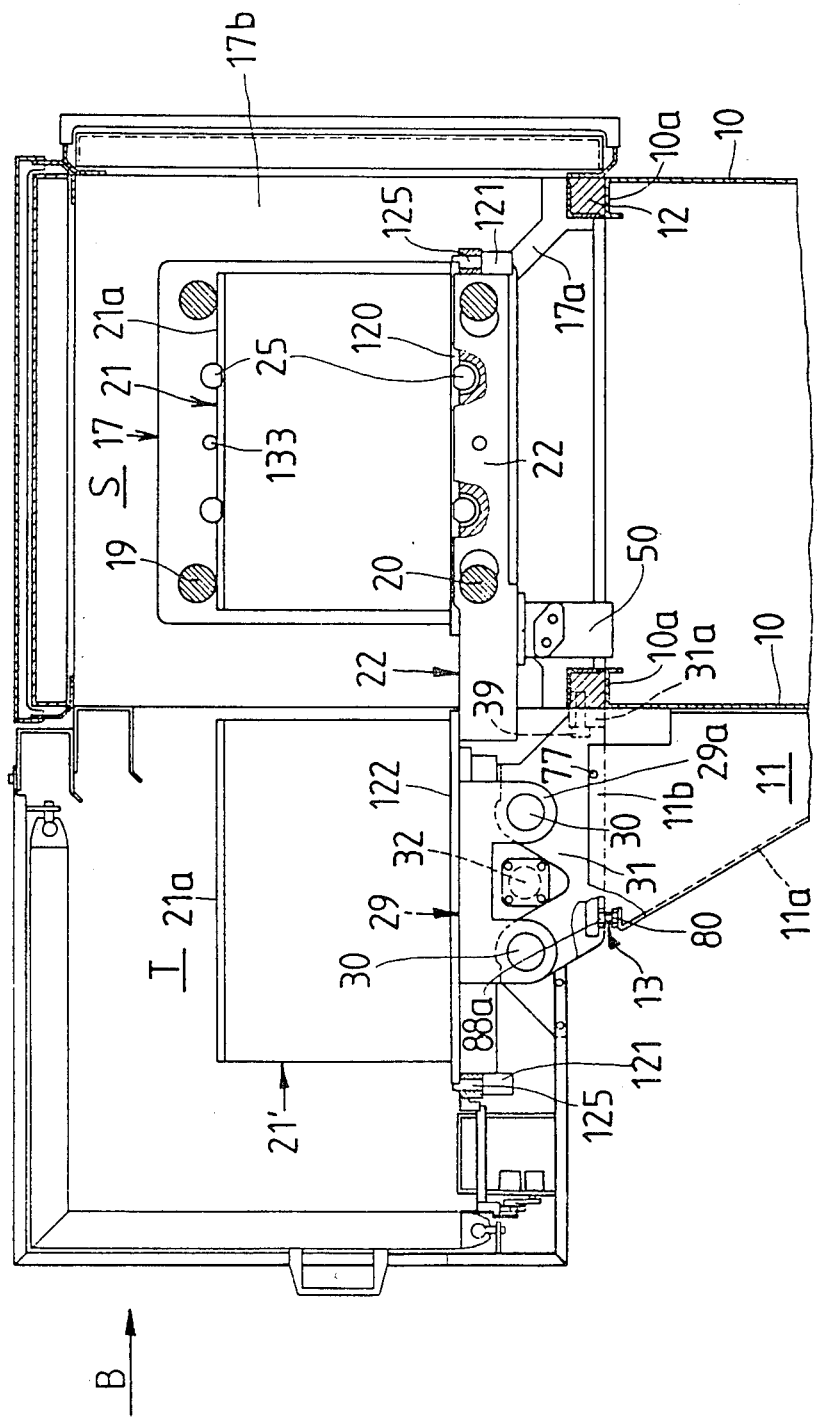
FIG. 1 shows, partially in a lateral elevational view in direction A of FIG. 2 and partially in a vertical transverse cross section, an injection molding machine with a horizontal die closing unit and a die exchange mechanism embodying the present invention.

As can be seen in FIG. 1 of the drawing, the injection molding machine incorporating the die exchange mechanism of the present invention has a horizontal die closing unit which is supported by a machine base 10. The latter is a hollow, generally prismatic structure formed of welded sheet metal. The machine base 10 carries on its upper longitudinal edges two parallel guide rails 12 to which the die closing unit is attached.

Figure 2:
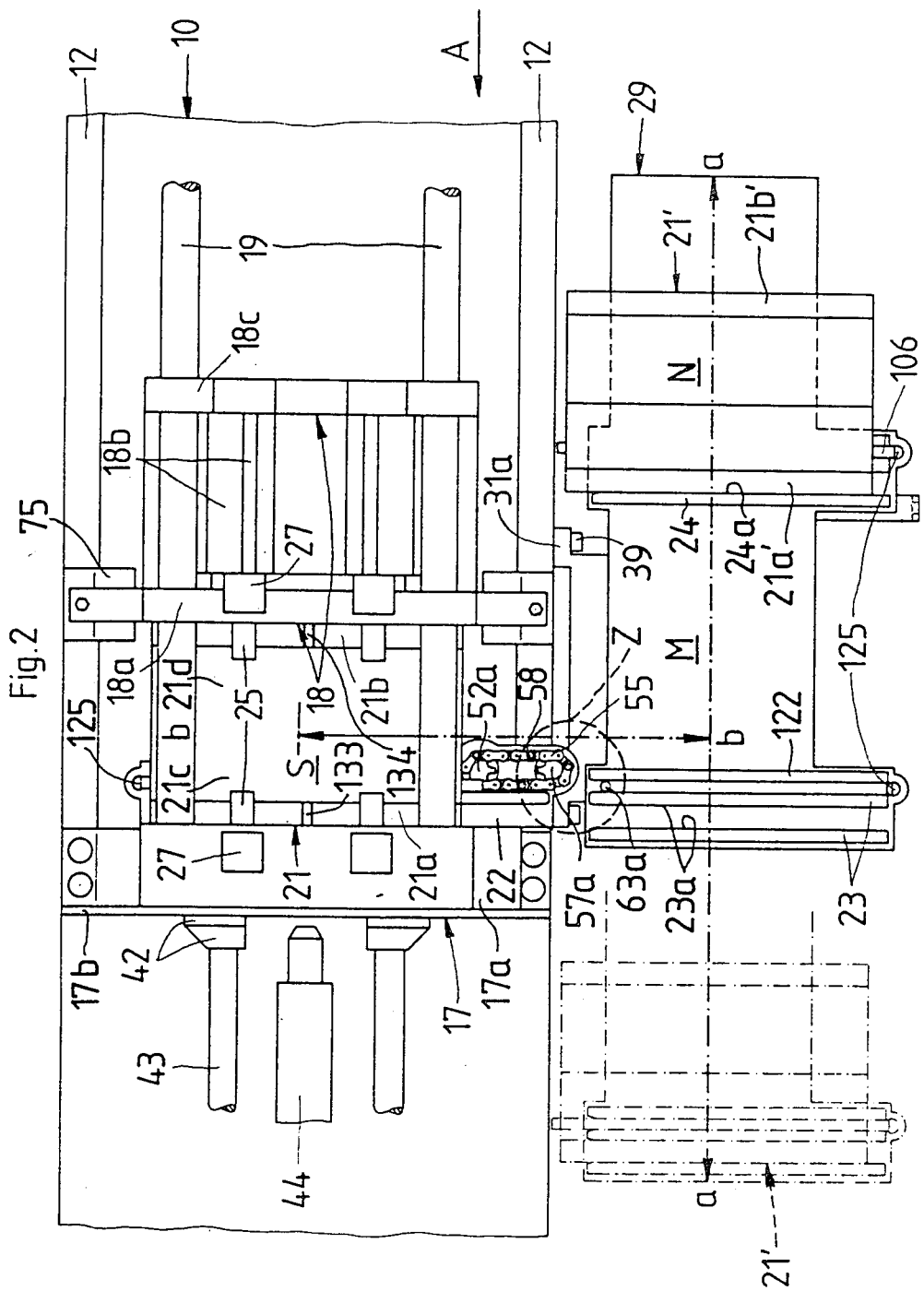
FIG. 2 is a plan view corresponding to FIG. 1, showing the central portion of the die closing unit without safety cover and with one die assembly in operating position and another die assembly in waiting position.
Figure 3:
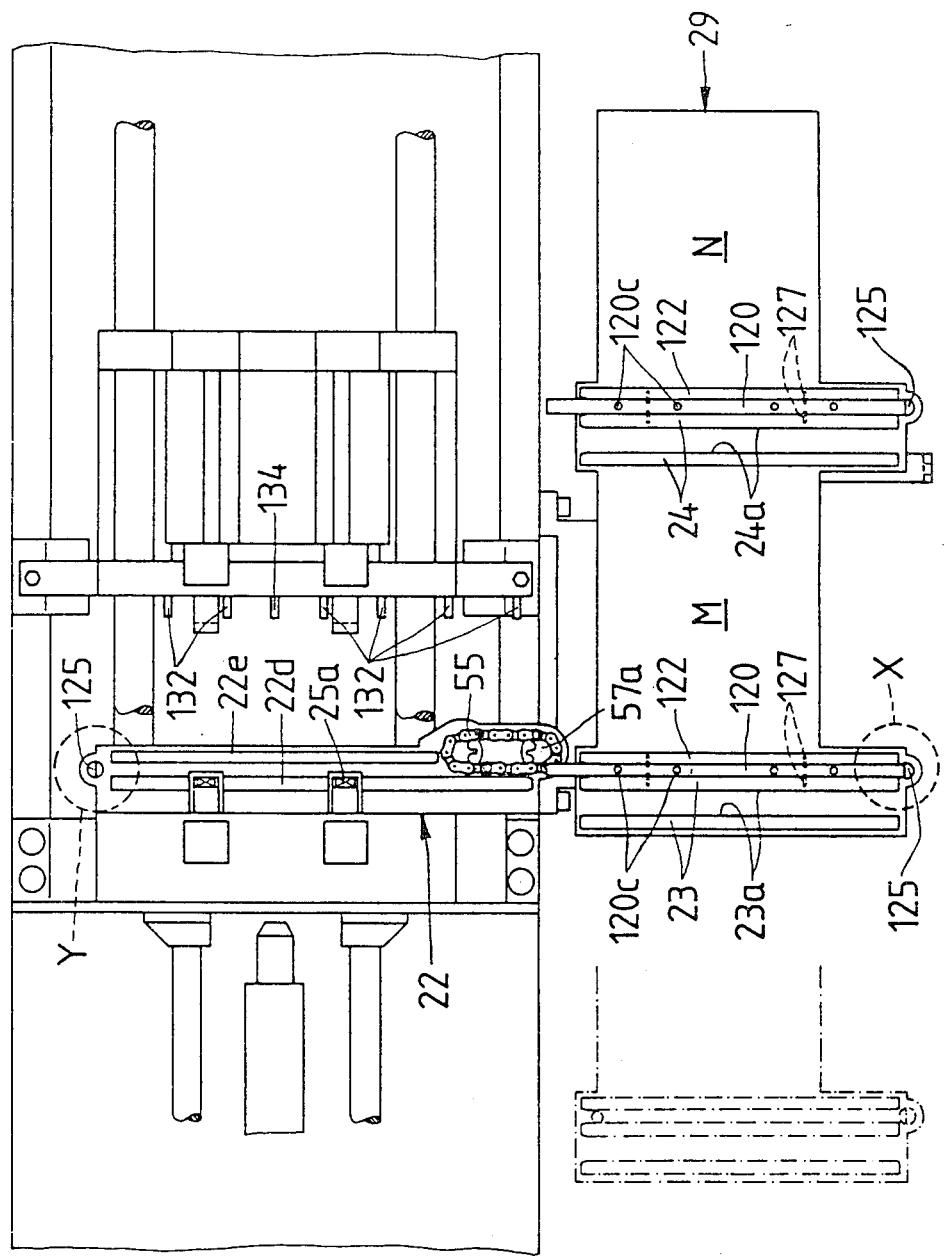
FIG. 3 corresponds to FIG. 2, showing the die exchange mechanism with both die assemblies removed.

FIGS. 2 and 3 show that the die closing unit comprises a stationary die carrier member 17 and a movable die carrier member 18, the two die carrier members facing each other across a die clamping space S (FIG. 2). The machine base 10 also carries a stationary cylinder head plate, not shown, at a distance behind the movable die carrier member 18. Two upper tie rods 19 and two lower tie rods 20 extend horizontally between the stationary die carrier member 17 and the earlier-mentioned cylinder head plate, thus forming a rigid stationary frame, while supporting and guiding the movable die carrier member 18 for die opening and die closing movements.

The stationary die carrier member 17 engages the two guide rails 12 of the machine base 10 by means of two diagonally extending mounting struts 17a. An enlarged reinforcing shield 17b forms a collar on the outer side of the die carrier member 17. The guide rails 12 are welded to angled horizontal flange portions 10a of the side walls of the machine base 10.

The movable die carrier member 18 is in the form of an open frame, having a die mounting wall 18a facing the clamping space S and a pressure transfer wall 18c on the axially opposite side, the two walls being connected by pressure transfer ribs 18b. A power cylinder, likewise not shown, is supported by the earlier-mentioned cylinder head plate. The horizontal piston rod of the cylinder assembly is attached to the center of the pressure transfer wall 18a. The movable die carrier member 18, in addition to being supported by the tie rods 19 and 20, may also engage the guide rails 12 with two special anti-friction guide assemblies 75.

On the back side of the stationary die carrier member 17 is arranged an injection unit of which only the forward extremities of the plastification cylinder 44 and of two guide rods 43 are shown. The latter are attached to the die carrier member 17 by means of mounting elements 42.

Figure 4:
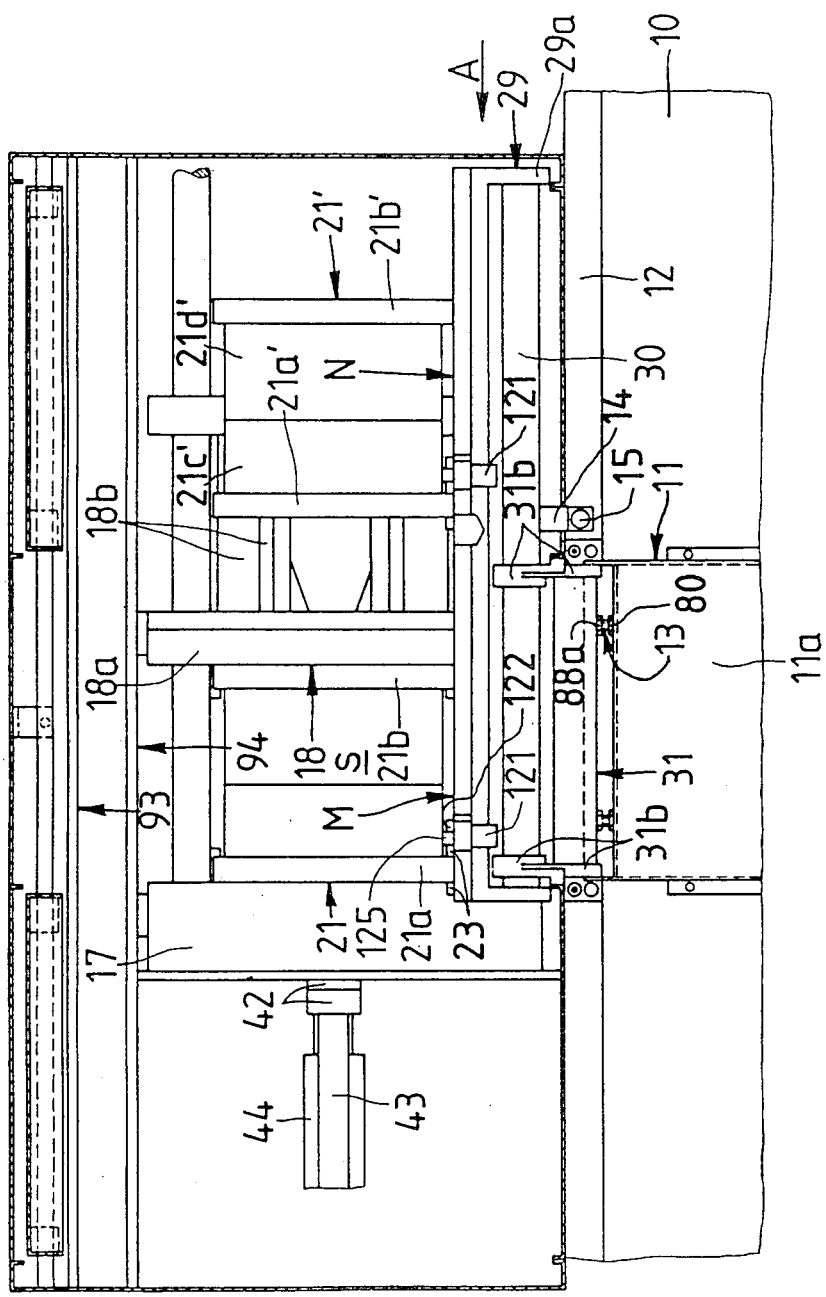
FIG. 4 shows the arrangement of FIGS. 1-3 in an elevational view along arrow B of FIG. 1.

FIGS. 1, 2 and 4 show an injection molding die, or die assembly 21, held in operating position in the die clamping space S between the stationary and movable die carrier members 17 and 18. The die assembly 21 consists essentially of two die halves, engaging each other on opposite sides of a transverse die separation plane. A similar die assembly 21' is shown to be supported by a translation table 29 in a waiting position outside the die closing unit.

The stationary die half has on its outer side a back plate 21a, and the movable die half has a similar back plate 21b. The second die assembly has identical back plates 21a' and 21b', respectively, although the axial depth of the die assembly 21' may differ from that of the die assembly 21, due to different depths of the injection cavities in the other die plates 21c and 21d, or 21c' and 21d', respectively.

While the cavity plates of a set of die assemblies may differ over a relatively wide range which is limited by the maximum axial opening distance of the die closing unit, the back plates 21a and 21b of the various die assemblies are preferably of uniform size. Another uniform feature of the die assemblies is that their back plates 21a and 21b protrude upwardly and downwardly over the other plates of the die assembly to form flange portions with horizontal lower end faces on which the die assembly is supported. The lower flange portion of the back plate of the stationary die half also has parallel vertical guide faces.

In the operating position, the die halves of the die assembly are clamped against their associated die carrier members 17 and 18 by means of two pairs of clamping plungers 25 (FIGS. 2 and 3) which are guided in horizontal bores of the die carrier members. The clamping plungers 25 have hook-like clamping noses 25a engaging the inner sides of the upper and lower flange portions of the back plates 21a and 21b. The clamping movements of the clamping plungers 25 are produced by transversely arranged hydraulic cylinders 27 with piston rods having a wedge taper in engagement with the clamping plungers 25. Further details of these clamping devices are disclosed in my copending U.S. patent application, Ser. No. 449,550, filed Dec. 13, 1982.

As can best be seen in FIG. 3, the translation table 29 has on its upper side two die emplacements M and N which are adapted to carry a die assembly at the same level as that of the die assembly in the operating position in the clamping space S. The longitudinal distance between the two die emplacements M and N is such that two die assemblies of maximum axial depth can be accommodated side-by-side on the translation table 29.

The transfer of a die assembly from the translation table 29 to the clamping space takes place along a rectangular horizontal path which is composed of a longitudinal translation path a—a of a length which corresponds to the distance between the two die emplacements, and a transverse transfer path b—b of a length which corresponds to the distance between the die emplacement M—which coincides with the transfer position—and the operating position.

The translation table 29 which executes the translation movement is supported on a stationary supporting frame 31, engaging guide bores of the latter with two horizontal guide rods 30. The guide bores are arranged in vertical transverse wall members 31b (FIG. 9) on the longitudinal extremities of the supporting frame 31. The extremities of the guide rods 30 are attached to two downwardly offset attachment lugs 29a at the extremities of the translation table 29.

As can be seen in FIGS. 1, 2 and 9, the wall members 31b of the supporting frame 31 terminate in lateral mounting legs 31a which are clamped to the outer sides of the near guide rail 12 by means of bolts 39. A sheet metal bracket 11 serves to stabilize the cantilever-type attachment of the supporting frame 31 on the machine base 10. The bracket 11 has a triangular outline, its outer wall 11a being inclined at an acute angle to the near side wall of the machine base.

The supporting frame 31 rests on the bracket 11 by means of two leveling devices 13 which consist of leveling bolts 80 engaging threaded bores of the frame 31 and pressing with their heads against a horizontal face of the bracket 11. Counter-nuts 88a secure the adjustment setting. The transverse side walls 11b of the bracket 11 reach upwardly into the area of the transverse wall members 31b of the frame 31, where they are attached to the latter by means of screws 77. (FIG. 1). The leveling devices 13 make it possible to adjust the height of the translation table 29 for a precise horizontal alignment between the level of the die emplacements M and N and the level at which the die assembly is supported in the die closing unit.

The translation movement is obtained by means of a hydraulic cylinder assembly 32 which can be seen in FIG. 9. The cylinder assembly 32 includes two cylinder end covers 32a and 32b of which the former is attached to a transverse wall member 31b of the frame 31. A plurality of tie rods 60 clamp the cylinder end covers 32a and 32b against the cylinder extremities. The piston rod 33 of the cylinder assembly 32 is attached to an attachment ear 29b of the translation table 29 on the same side on which the cylinder assembly is attached to the supporting frame 31. This attachment is longitudinally adjustable by means of a threaded extremity on the piston rod 33 and a counter-nut 61.

On its opposite extremity, the cylinder assembly 32 carries a valve block 14 and a reversing valve 15 for the hydraulic motor of a transfer drive, which is described further below. As can be seen in FIG. 1, the cylinder assembly 32 is arranged parallel to, and horizontally between, the two guide rods 30 of the translation table 29.

As can be seen in FIGS. 3 and 9, the two die emplacements M and N on the translation table 29 have each a pair of guide ledges 23 and 24, respectively, attached to the top surface of the translation table 29. The two pairs of guide ledges form guide channels with opposing guide faces 23a and 24a, respectively. Into each guide channel fits the lower flange portion of the back plate 21a (or 21a') of the stationary die half of a die assembly (FIG. 9). The back plate 21b (or 21b') of the movable die half rests freely on the translation table 29; its position on the table may vary, depending on the axial depth of the die assembly.

The distance between the two guide channels is equal to the length of the translation movement, so that, when the translation table 29 moves to the left, into the position shown in FIG. 3 by stippled lines, the guide ledges 24 come to occupy the position previously occupied by the guide ledges 23. This position is the transfer position for the die assembly. Accordingly, the left-hand die emplacement M, shown in the drawing to coincide with the transfer position, alternates between the latter and a waiting position to the left thereof, while the right-hand die emplacement N alternates between the transfer position and a waiting position to the right thereof.

The guide ledges 23a of the die emplacement in transfer position are so arranged that the guide face 23a which cooperates with the outer face of the back plate 21a is aligned with the die mounting face of the stationary die carrier member 17, so that the back plate of a die assembly 21 in transfer from the transfer position to the operating position slides over said mounting face with minimal axial clearance.

For this purpose, the stationary die carrier member 17 has attached to its lower part a guide shelf 22 which can be seen in FIGS. 1, 10 and 11. The guide shelf 22 has a horizontal guide face 22a in alignment with the top surface of the translation table 29, so that the lower end face of the back plate 21a of the die assembly can slide smoothly from the translation table onto the guide face 22a of the guide shelf 22. Similarly, the die mounting face of the die carrier member 17 and an opposing vertical guide face 22b of the guide shelf 22 provide axial guidance for the back plate 21a.

The back plate 21b of the movable die half of the die assembly 21, being slidable on the translation table 29 without guidance in the axial sense of the die closing unit, is supported by the movable die carrier member 18 which, for this purpose, carries a row of axially extending supporting pins 132. The uppermost surfaces of these pins engage the horizontal end face of the back plate 21b, and they form a common horizontal die support plane with the horizontal guide surface 22a of the guide shelf 22 and with the top surface of the translation table 29.

The controls of the injection molding machine are so programmed that, prior to the transfer of a die assembly from the transfer position on the translation table to the operating position in the die closing unit, the movable die carrier member 18 is positioned a minimal distance short of the closed position for the particular die assembly. A corresponding minimal die opening stroke is necessary for the transfer of a die assembly from the die closing unit onto the translation table. This opening stroke is preferably in the order of 1 mm or less.

The transfer of a die closing unit from the translation table into the die closing unit with a minimal opening of the latter is made possible through the use of the earlier-mentioned horizontal clamping plungers 25 whose clamping noses 25a (FIG. 3) engage the inwardly facing sides of the back plates 21a and 21b of the die assembly.

The clamping plungers 25 execute a horizontal release movement which is greater than the minimal opening stroke, so that they are clear of the path of the back plates, during the transfer movement of the die assembly 21.

Upper guide pins 133 and 134 on the stationary die carrier member 17 and on the movable die carrier member 18, respectively, (FIGS. 1 and 2), provide an additional guiding function against the upper back plates 21a and 21b of the die assembly 21.

The guide shelf 22 of the stationary die carrier plate 17 carries a transfer drive which can be seen in FIGS. 2 and 3, and which is shown at a larger scale in FIGS. 10 and 11. This transfer drive serves to mechanically move the die assembly 21 along the transfer path b—b, between the transfer position on the translation table 29 and the operating position in the clamping space S of the die closing unit.

The transfer drive consists essentially of a horizontally circulating endless roller chain 55 which has two short straight runs in parallel alignment with the transfer path b—b. The roller chain 55 is supported on a drive sprocket 55a and a return sprocket 57a, the chain and the two sprockets being received in a matching oblong recess 22f of the guide shelf 22. As can be seen in FIG. 10, the drive sprocket 52a is part of a drive sleeve 52 which is attached to the vertical drive shaft 50a of a hydraulic drive motor 50 by means of a key and a bolt 124. The drive sleeve 52 has a cylindrical outer surface with which it is received inside a bushing 123 in the guide shelf 22, thus providing a bearing support for the drive sprocket 55a.

The endless roller chain 55 carries on its upper side a number of regularly spaced drive pins 58 which serve as revolving drive elements, comparable in function to the pins of a revolving pin gear. Cooperating with the drive pins 58 of the roller chain 55 is a drive rack 120 (FIGS. 5-8) which has a series of regularly spaced drive recesses 120a for engagement by the drive pins 58 of the roller chain 55. The spacing or pitch of the drive recesses 120a on the drive rack 120 corresponds to the spacing of the drive pins 58 on the straight runs of the roller chain.

The mechanism of the invention has two identical drive racks 120, one associated with each die emplacement on the translation table 29. FIGS. 5-8 show that the drive rack 120 carries on its upper side a number of entrainment pins 120c. These pins engage matching entrainment bores, not shown, of the die assemblies 21 and 21'. Like the back plates, the entrainment bores are preferably a uniform feature of the stationary die halves of all the die assemblies which are to be handled by the device of the invention.

The two drive racks 120 are guided parallel to and independently of the guide channels for the guided back plate 21a. As can be seen in FIG. 9, the inner one of the two guide ledges 23, or 24, respectively, also cooperates with a third guide ledge 122 to form a guide channel for the drive rack 120. With the die emplacement in transfer position, the guide channel for the drive rack is aligned with a corresponding guide channel in the guide shelf 22 which is formed between two guide ridges 22d and 22e of the guide shelf 22. The guide ridge 22e is shortened to accommodate the recess 22f for the roller chain 55 of the transfer drive (FIG. 11).

As can be seen in FIG. 9, the guide ledges 23 and 122 which form the guide channel for the drive rack 120 have short restraining pins protruding horizontally from their guide faces into lateral grooves 120d of the drive rack 120. These pins serve to vertically restrain the drive rack 120, when the die assembly 21 is lifted off its die emplacement.

The connection of a die assembly with a drive rack 120 on a die emplacement in waiting position, for example, the connection of the die assembly 21' with the drive rack 120 in the die emplacement N, is achieved by simply lowering the die assembly 21' onto the translation table 29, while the back plate 21a' of the stationary die half is longitudinally aligned with the guide channel between the guide ledges 24 and the entrainment bores are brought into transverse alignment with the entrainment pins 120c of the drive rack 120.

FIG. 10 shows that the drive rack 120 is guided to move vertically adjacent to the roller chain 55, above the chain run which is closer to the stationary die carrier member 17. The drive recesses 120a of the drive rack 120 have a lateral depth which is approximately equal to the diameter of the drive pins 58. The first drive recess on the near extremity of the drive rack 120 is modified to form a groove 120b across the width of the drive rack. The groove 120b makes it possible to obtain an automatic engagement and disengagement between the drive rack 120 and the nearest drive pin 58 of the roller chain 55, when a die emplacement of the translation table 29 is moved into or out of the transfer position. During the transfer movement, the transfer drive is stopped in a position in which the nearest drive pin 58 is located at the proximate end of the straight driving run of the roller chain 55.

While the two drive racks 120 are movable in their guide channels for the execution of a transfer movement, the mechanism of the invention provides that the drive racks are restrained against such movements in all positions of the translation table 29, except when a drive rack is in the transfer position, i.e. aligned and engaged with the roller chain 55 of the transfer drive. This is accomplished by arranging in each die emplacement of the translation table 29 a vertically movable restraining plunger 63 (FIG. 15) which has on its upper extremity a positioning finger 63a arranged to engage the second drive recess 120a of the drive rack 120.

Moving to the restraining plunger 63 is a rocker arm 128 (FIG. 16) which is supported on a pivot pin 131 and connected to the lower end of the restraining plunger 63 by means of a connecting pin 130. The free leg of the rocker arm 128 is biased downwardly by a compression spring 129 in a bore of the translation table 29, so that the restraining plunger 63 is urged upwardly against the drive rack 120.

The supporting frame 31 of the translation table 29 carries a stationary release cam 31c (FIGS. 15 and 16) which is so arranged that the free leg of the rocker arm 128 is deflected upwardly, when the particular die emplacement is in the transfer position. In this configuration (FIG. 16), the restraining plunger 63 is lowered away from the drive rack 120, so that the latter is free to execute a transfer movement. This also signifies that, in the waiting position, the drive rack 120 is not only restrained vertically, to remain in its die emplacement, but also restrained against movements along its guide channel on the translation table 29.

As can be seen in FIGS. 4 and 13, the translation table 29 is also equipped with two limit switches 120 on its outer side, each die emplacement having a limit switch aligned with its drive rack 120. The electrical lines 121 and 121' of the limit switches 121 form part of an electro-hydraulic control circuit which also includes the valve 15 and which controls the movements of the drive motor 50 of the transfer drive.

A third limit switch 121 is arranged on the far side of the guide shelf 22 of the stationary die carrier member 17 (FIGS. 1 and 17). The three limit switches 121 have vertically movable switch plungers 121a in engagement with vertically guided switch drivers 125, the latter being biased upwardly by compression springs 126. The switch drivers 125 have on their upper end portion an inclined cam face 125a and an upstanding vertical abutment face reaching into the path of the drive rack 120.

A switching action is obtained, when an extremity of the drive rack 120 moves against the inclined cam face 125a of a switch driver 125, thereby pushing the latter downwardly to actuate the limit switch 121. The vertical abutment face of the switch driver 125 serves as a mechanical stop for the transfer movement.

The preferred location of the die exchange mechanism on the injection molding machine is on the back side (FIG. 1). This arrangement maintains the full accessibility of the die closing unit from the front side. The translation table 29 is preferably covered by a removable hood which forms an extension of the safety cover of the die closing unit.

A major advantage of the novel mechanism of the invention is its suitability for a fully automatic die exchange operation, the latter being preferably pre-programmed for each injection molding die. In addition to thus reducing the time required for the actual exchange of one die assembly for another, the mechanism offers the possibility of performing preparatory operations, such as preheating, on a die assembly which is in a waiting position on the translation table.

Further time-saving steps become possible, when two separate die conditioning systems are provided and when the various fluid lines and control lines are connected to the die assembly in the waiting position on the translation table and remain connected to the die assembly during transfer and during the subsequent production operations. Such a system is disclosed in my copending U.S. patent application, Ser. No. 506,026, filed June 20, 1983.

It should be understood, of course, that the foregoing disclosure describes only a preferred embodiment of the invention and that it is intended to cover all changes and modifications of this example of the invention which fall within the scope of the appended claims.

I claim the following:

1. In an injection molding machine which has a machine base carrying a horizontally oriented die closing unit with a stationary die carrier member, a movable die carrier member, and a drive assembly producing horizontal die opening and die closing movements along the longitudinal center axis of the die closing unit, and wherein the stationary and movable die carrier members have parallel vertical die mounting faces and include means for releasably clamping to said die mounting faces the two halves of a succession of different injection molding dies which, for this purpose, are equipped with standardized oversize back plates which are engageable by said clamping means; in such a machine, a mechanism for exchanging injection molding dies by mechanically removing the previously installed die assembly from its operating position in the die closing unit and inserting in its place another die assembly, the mechanism comprising in combination:

a translation table arranged alongside the die closing unit and adapted to support two die assemblies at the same level at which a die assembly is held in operating position by said two die carrier members, the translation table defining two die emplacements equidistant from the center axis of the die closing unit, the translation table being guided for horizontal longitudinal movements parallel to said center axis, over a distance corresponding to the longitudinal spacing between said die emplacements, so that, in each end position of the translation table, one die emplacement coincides with a transfer position in which the back plate of a stationary die half in said die emplacement is substantially aligned with the mounting face of the stationary die carrier member;

a translation drive connected to the translation table for the creation of said longitudinal movements of the translation table;

means defined by each of the two die emplacements on the translation table for guiding a die assembly for horizontal transfer movements at right angles to the center axis;

means defined by the stationary and movable die carrier members for supporting a die assembly in its operating position, after release from the mounting faces of said members, and for guiding said die assembly for horizontal transfer movements at right angles to the center axis; and a transfer drive engageable with a die assembly in a die emplacement of the translation table which is coincident with the transfer position, so as to entrain said die assembly in a positively controlled transfer movement between the transfer position and the operating position; and wherein each die emplacement has its guide means so arranged that, in the transfer position, it cooperates with the support and guide means of the two die carrier members to define a substantially continuous straight-line transfer path for the die assembly between the transfer position and the operating position.

2. A mechanism as defined in claim 1, wherein the translation table includes a stationary supporting frame which is attached to the machine base and two horizontally oriented parallel guide rods extending between downwardly offset attachment ears on the extremities of the translation table;

the supporting frame has on its longitudinal extremities upstanding wall members with matching horizontal guide bores receiving the guide rods; and the translation drive includes a horizontally oriented hydraulic cylinder assembly of which the cylinder is attached to the supporting frame and the piston rod is attached to the translation table.

3. A mechanism as defined in claim 2, wherein the supporting frame of the translation table further includes a sheet metal bracket which is attached to the machine base and threaded adjustment means associated with said bracket, for adjusting the level of the translation table.

4. A mechanism as defined in claim 1, wherein the standardized oversize back plates of the two die halves of each die assembly protrude downwardly from the die assembly to form flange portions with parallel oppositely oriented vertical guide faces and with horizontal end faces which serve as supporting surfaces for the die assembly; and the guide means of each die emplacement includes a pair of parallel transversely oriented guide ledges on the translation table, the guide ledges cooperating with the vertical guide faces of the stationary die half of a die assembly in said die emplacement.

5. A mechanism as defined in claim 4, wherein the back plates of the die halves also protrude upwardly from the die assembly to form similar flange portions on the upper side of the latter; and the clamping means of the die carrier members include a plurality of horizontally movable clamping plungers arranged to engage the upper and lower flange portions of both back plates of the die assembly with hook-like clamping noses engaging the protruding flange portions, so that the inner ones of said vertical guide faces of the back plates also serve as clamping faces in the operating position of the die assembly.

6. A mechanism as defined in claim 5, wherein the die assembly supporting and guiding means of the die carrier members is adapted for the execution of a minute opening movement of the movable die carrier member, to provide a minimal movement clearance between the die carrier members and the back plates of the die assembly, for the die carrier plates to perform a guiding function; and the die assembly supporting and guiding means also accommodates a corresponding closing movement of the movable die carrier member, prior to the actuation of the clamping plungers into clamping engagement with the back plates of the die halves.

7. A mechanism as defined in claim 4, wherein the die assembly supporting and guiding means of the two die carrier members includes a guide shelf protruding horizontally from the lower part of the stationary die carrier member towards the moving die carrier member, the guide shelf having a horizontal guide surface supporting the back plate end face of the stationary die half of a die assembly in operating position and an upstanding guide ridge with a vertical guide surface extending parallel to the die mounting face of said die carrier member so as to guide said back plate between it and the die mounting face.

8. A mechanism as defined in claim 7, wherein said die assembly supporting and guiding means further includes a horizontal row of supporting pins extending axially from the movable die carrier member into engagement with the back plate end face of the movable die half of said die assembly; and the uppermost surfaces of the supporting pins and the horizontal guide surface of the guide shelf form a common horizontal die support plane determining the operating position of the die assembly in the die closing unit in the vertical sense.

9. A mechanism as defined in claim 1, wherein the stationary die carrier member includes a shelf extending from its die mounting face, underneath the space occupied by the stationary half of the die assembly; and the transfer drive is supported by said shelf and includes a drive assembly with revolving drive elements cooperating with a row of regularly spaced drive recesses of a member of the die assembly in a rack-and-pinion-type drive con- figuration.

10. A mechanism as defined in claim 9, wherein the transfer drive includes a roller chain drive with an endless roller chain moving along a horizontal oblong path of which one straight run is a driving run, extending parallel to the transfer path of the die assembly, the driving run of the roller chain being defined by a drive sprocket and a return sprocket on transversely spaced vertically oriented shafts;

the revolving drive elements are drive pins which extend vertically from the roller chain; and the transfer drive further includes a drive motor which is connected to the shaft supporting the drive sprocket.

11. A mechanism as defined in claim 10, wherein said die assembly member with the spaced drive recesses is a drive rack which is arranged on the underside of the die assembly and which transmits to the latter the movements of the driving run of the revolving roller chain; and at least the first drive recess of the drive rack is in the form of a transverse groove on the underside of the drive rack into and out of which the nearest drive pin of the roller chain is movable in both longitudinal directions, when a die assembly on the translation table approaches or leaves the transfer position.

12. A mechanism as defined in claim 10, wherein said die assembly member with the spaced drive recesses is a drive rack which is removably connected to the underside of the die assembly, transmitting to the latter the movements of the driving run of the revolving roller chain;

the drive rack is connectable to a succession of different die assemblies which have standardized rack connecting elements;

each of the two die emplacements on the translation table includes such a drive rack;

each die emplacement further defines means for independently guiding its drive rack for movements parallel to said die transfer path; and said shelf of the stationary die carrier plate defines similar means for independently guiding the drive rack for movements parallel to said die transfer path, in alignment with the rack guide means of the die emplacement coinciding with the transfer position.

13. A mechanism as defined in claim 12, wherein each drive rack is vertically restrained by its guide means, so as to remain in place on the translation table, when a die assembly is lifted off its die emplacement on the translation table, the drive rack thereby being disconnected from the die assembly;

each drive rack carries a plurality of upwardly extending entrainment pins; and said standardized rack connecting elements of the die assemblies are in the form of vertical bores on the underside of each die assembly which are engageable by the entrainment pins of a drive rack.

14. A mechanism as defined in claim 12, wherein each die emplacement on the translation table further includes means for restraining its drive rack against transfer movements, when the die emplacement is not in alignment with the transfer position.

15. A mechanism as defined in claim 14, wherein the drive rack restraining means includes, in each die emplacement of the translation table, a restraining plunger which is mounted in the translation table, underneath the drive rack, and guided for vertical movements into and out of engagement with the drive rack; and the drive rack restraining means further includes a stationary release cam in the area of the transfer position which, when the translation table approaches an end position, cooperates with the drive rack restraining plunger of the die emplacement approaching the transfer position, to retract the latter downwardly out of engagement with the drive rack.

16. A mechanism as defined in claim 12, wherein the stationary die carrier member carries an inner end switch in alignment with the path of the drive rack defined by said shelf, said end switch being arranged for actuation by an extremity of the drive rack, to stop the movement of the transfer drive, when a die assembly moving along the transfer path approaches its operating position; and each die emplacement of the translation table includes an outer end switch which is similarly aligned with the path of the associated drive rack, said end switch of the die emplacement in transfer position being arranged for actuation by an extremity of the drive rack, to stop the movement of the transfer drive, when a die assembly moving along the transfer path approaches its transfer position.

17. A mechanism as defined in claim 16, wherein each of the inner and outer end switches has associated therewith a vertically guided switch driver with an inclined cam face engageable by an extremity of the drive rack to actuate the end switch; and each switch driver further includes an upstanding abutment shoulder behind its inclined cam face, said abutment shoulder facing the extremity of the drive rack, so as to serve as a mechanical stop for the latter.

* * * * *